United States Patent [19]

Griffith

[11] Patent Number: 4,865,005
[45] Date of Patent: Sep. 12, 1989

[54] DIESEL FUEL HEATER

[76] Inventor: Eugene E. Griffith, R.D. 2, Box 562, Lenhartsville, Pa. 19534

[21] Appl. No.: 141,487

[22] Filed: Jan. 7, 1988

[51] Int. Cl.⁴ .............................................. F02M 31/10
[52] U.S. Cl. ...................................... 123/546; 123/557
[58] Field of Search .......................... 123/557, 546, 547

[56] References Cited

U.S. PATENT DOCUMENTS

| | | | |
|---|---|---|---|
| 4,237,850 | 12/1980 | Connor et al. | 123/557 |
| 4,395,996 | 8/1983 | Davis | 123/557 |
| 4,656,979 | 4/1987 | Hogenson | 123/557 |
| 4,726,346 | 2/1988 | Lucht | 123/557 |

FOREIGN PATENT DOCUMENTS 0055461 7/1982 European Pat. Off. ............ 123/557

Primary Examiner—Willis R. Wolfe
Assistant Examiner—M. Macy
Attorney, Agent, or Firm—Joseph W. Molasky & Assocs.

[57] ABSTRACT

A heater for diesel fuel contained in a fuel tank for supplying the diesel engine of a vehicle is disclosed. The heater includes a heating tube arranged to heat the fuel in the drawtube as it leaves the fuel tank.

6 Claims, 2 Drawing Sheets

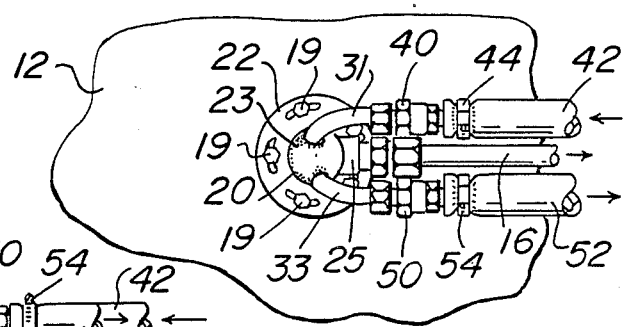
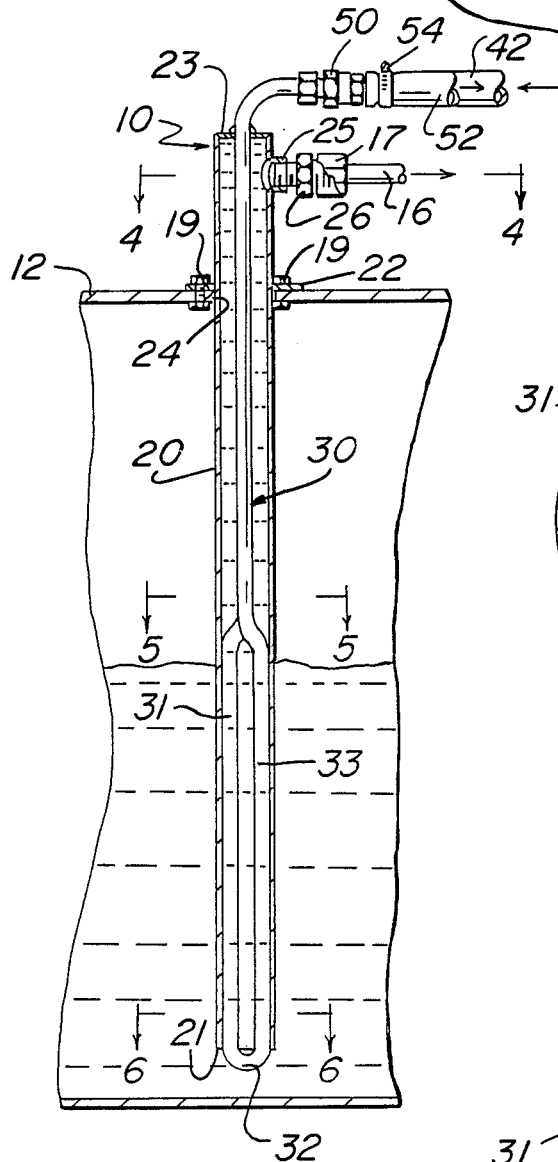
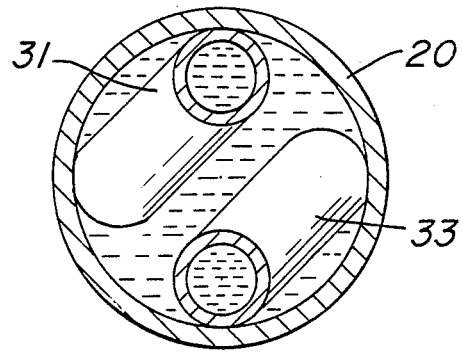
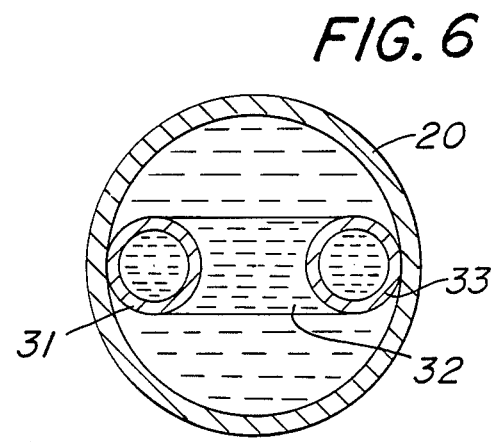

DIESEL FUEL HEATER

BACKGROUND OF THE INVENTION

1. Field of the Invention

This invention relates to the field of heaters for diesel fuel contained in a fuel tank for supplying fuel to a diesel engine of a vehicle.

2. Description of the Prior Art

Diesel fuel has a tendency to jell or wax in cold weather. Thus, when operating diesel engine vehicles in cold weather it is important to heat the diesel fuel supplied to the diesel engine to keep the fuel flowing smoothly and thereby prevent failure of the engine. This is a particularly serious problem in very cold weather areas and can result in vehicle breakdown and startup problems requiring the vehicle to be towed to a service area and the fuel tank heated before the vehicle can be operated. This is a highly costly situation.

There have been provided heaters of the indicated type. Illustrative of these prior art heaters are the devices disclosed in U.S. Pat. Nos. 3,110,296; 4,237,850; 4,286,551 and 4,338,891.

Other heaters disclosed in the prior art are the devices disclosed in U.S. Pat. Nos. 2,980,172; and 2,916,030.

SUMMARY OF THE INVENTION

It is the general object of this invention to provide an improved heater for diesel fuel contained in a fuel tank for supplying diesel fuel to the diesel engine of a vehicle.

Briefly stated, the heater in accordance with the invention is adapted to be used as a diesel fuel heater for use in automobiles or trucks having water-cooled engines. The heater includes a heat exchanger tube which is mounted to extend within the drawtube of the fuel tank. The fuel is drawn from the fuel tank through the drawtube, which extends vertically into the tank and has the heat exchanger tube positioned therewithin. Engine coolant fluid is circulated through the heat exchanger tube to therby raise the temperature of the fuel as it is withdrawn from the tank to prevent formation of ice crystals which may clog fittings and filters.

The improved heater in accordance with the invention keeps the fuel flowing smoothly from the fuel tank to the engine to prevent freeze-up under the coldest of weather conditions. Unlike most other diesel fuel heaters, the heater of the invention heats the fuel in the drawtube as it leaves the fuel tank for supply to the engine. This eliminates jelling and waxing problems in the flow lines, filters and water separaters. Also, the heater in accordance with the invention requires no maintenance, has no electrical parts, no seals or gaskets, and no moving parts which could fail or corrode.

Further, by use of the heater in accordance with the invention, the vehicle operators do not have to use expensive fuel additives and No. 1 fuel.

The device in accordance with the invention uses the hot water from the engine cooling system to heat the fuel as it is drawn from the tank. By the time the fuel leaves the tank and enters the fuel line it has been heated sufficiently to prevent jelling or waxing.

Another feature of the design in accordance with the invention is that there is no need to cut holes in the fuel tank or drill holes for mounting brackets in the frame rails under most installations. There are no electrical connections or wires to run and the heater in accordance with the invention does not require any extra-duty accessories such as higher-capacity alternators. Moreover, the device in accordance with the invention is easy to install and can be installed in a minimum of time.

BRIEF DESCRIPTION OF THE DRAWINGS

FIG. 2 is a sectional view, in elevation, of a heater in accordance with the invention.

FIG. 3 is a plan view of the heater shown in FIG. 2.

FIG. 5 is a sectional view taken on line 5—5 of FIG. 2.

FIG. 6 is a sectional view taken on line 6—6 of FIG. 2.

DETAILED DESCRIPTION OF THE INVENTION

Figure 1:
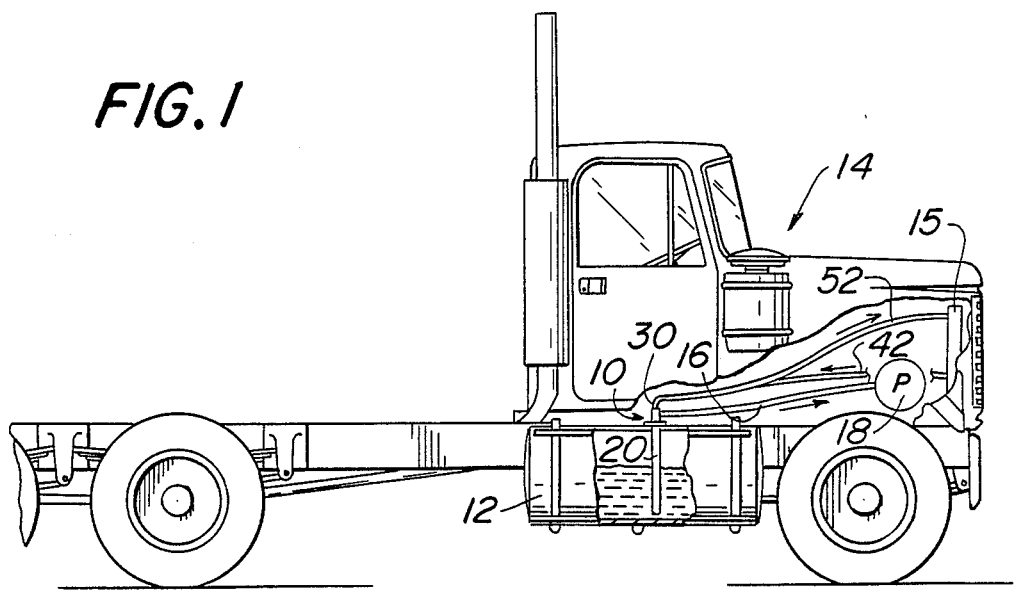
FIG. 1 is a side elevational view, partly broken away, of a vehicle utilizing a diesel fuel heater in accordance with the invention.
Figure 4:
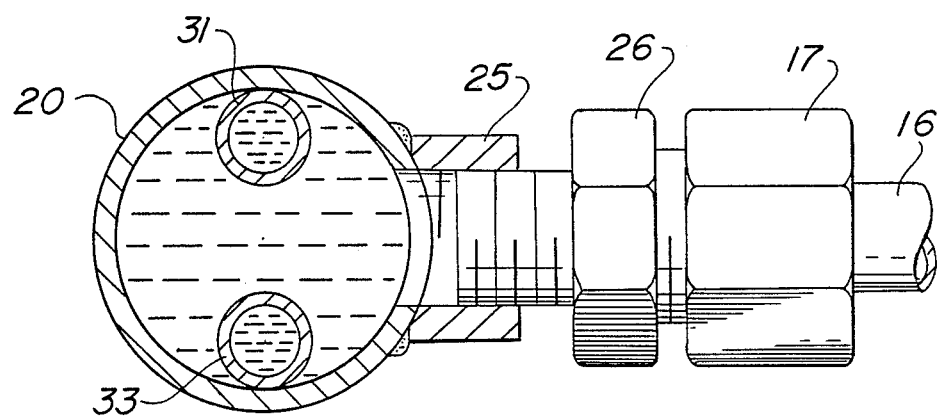
FIG. 4 is a sectional view taken on line 4—4 of FIG. 2.

Referring to the Drawings, there is shown a heater 10 for diesel fuel contained in a fuel tank 12 for supplying fuel to a diesel engine of a tractor-trailer cab 14. The heater 10 is shown installed on the fuel tank 12 but typically would be sold as an independent unit. The fuel tank 12 is mounted in a conventional manner on the cab 14 and is generally cylindrical in shape and constructed to hold a diesel-type fuel which is supplied through a fuel line 16 to the diesel engine by a fuel pump 18.

The heater 10 in accordance with the invention comprises a drawtube 20 and an annular cover plate 22 welded thereto for use in mounting the drawtube 20 to extend vertically from a circular access opening 24 at the top portion of the fuel tank 12 into the fuel tank 12 to a location near the bottom thereof. This mounting is achieved by means of five bolts 19 as shown in FIGS. 2 and 3. At a location above the cover plate 22 there is provided a discharge means for delivering fuel from the upper end of the drawtube 20 for supply to the diesel engine. The discharge means comprises an outlet pipe 25 and a conventional threaded flow fitting 26 which is engaged in outlet pipe 25 to extend horizontally from the upper end of the vertically extending drawtube 20, as best shown in FIG. 2. Flow fitting 26 is connected to fuel line 16 by a threaded flow fitting 17. The drawtube 20 is open at its bottom end 21 and closed at its top end by an end plate 23. Accordingly, when the fuel pump 18 is operated to supply fuel to the diesel engine of cab 14, diesel fuel in fuel tank 12 is drawn upwardly through the drawtube 20 and is discharged therefrom through flow fitting 26 at the upper end thereof.

In accordance with the invention, there is provided a heat exchanger means for heating the diesel fuel as it flows upwardly through the drawtube 20 to the discharge means. Such means comprises a heat transfer tube 30 having a first tube portion 31 extending from the upper end of the drawtube 20 downwardly through the interior thereof to a location near the open bottom end 21 thereof and a second tube portion 33 extending generally parallel to said first tube portion through the interior of said drawtube 20. There is provided means, in the form of a connecting tube portion 32, for interconnecting the first and second tube portions 31 and 33 at the bottom ends thereof near the open bottom end 21 of the drawtube 20 as is apparent from the drawings.

The upper ends of tube portions 31 and 33 extend through openings in end plate 23 and are secured thereto by welding in a manner to provide fluid tight seals at said openings. The upper ends of tube portions 31 and 33 extend upwardly from end plate 23 in a manner to diverge from one another and to terminate at horizontally extending ends.

The heat exchanger means comprises an inlet means connected to the first tube portion 31 at the upper end thereof for delivering heating liquid to heat transfer tube 30 by way of a suitable hose means connected to part of the cooling system 15 of the diesel engine. Such inlet means includes a flow fitting 40 connected to the horizontal upper end of tube portion 31 and having the downstream end of a hose line 42 connected thereto by a hose clamp 44, the upstream end of hose line 42 being connected to an outlet connection of the engine cooling system 15. The heat exchanger means also comprises outlet means connected to the second tube portion 33 at the upper end therof for discharging heating liquid from heat transfer tube 30, which liquid is returned to the engine cooling system 15 by way of suitable hose means. Such outlet means includes a flow fitting 50 connected to the horizontal upper end of tube portion 33 and having the upstream end of a hose line 52 connected thereto by a hose clamp 54, the downstream end of hose line 52 being connected to an inlet connection of the engine cooling system 15.

As is apparent from the drawings, the first tube portion 31 has a turn portion at approximately the medial portion thereof and the second tube portion 33 has a similar turn portion at the medial portion thereof (see FIGS. 2 and 5). The arrangement is such that the first and second tube portions 31 and 33 have upper portions extending vertically parallel to one another and located in a first vertical plane and lower portions extending vertically parallel to one another and located in a second vertical plane which is transverse to the first vertical plane. By reason of this arrangement, the flow of the fuel upwardly through the drawtube 20 will be heated very effectively. The arrangement permits relatively unrestricted flow of fuel while preventing the possibility of certain flow paths developing which will substantially avoid contact with the heat transfer tube 30 as could occur in the case of a heat transfer tube that provides parallel portions extending in a single vertical plane.

Another feature of the heater in accordance with the invention is the arrangement whereby the cover plate 22, the drawtube 20 and all the elements of the heat exchanger means are secured together to form a unitary structure. By this arrangement, the heater in accordance with the invention can be installed onto and removed from the fuel tank 12 as a unit, which makes for a very simple installation which is inexpensive and involves a minimum of time.

The drawtube 20 and the heat transfer tube 30 are preferably made of stainless steel. This results in good heat transfer and extra durability for the heater in accordance with the invention.

It will be apparent that various changes may be made in the construction and arrangement of parts without departing from the scope of the invention. Accordingly, it is not desired to be limited except as required by the following claims.

What is claimed is:

1. A heater for diesel fuel contained in a fuel tank for supplying a diesel engine of a vehicle, the fuel tank having an access opening at a top portion thereof, comprising:

a tubular drawtube, means for mounting said drawtube to extend vertically from said access opening into said fuel tank to a location near the bottom thereof, said drawtube defining an internal drawtube chamber through which the fuel in the fuel tank flows as it is drawn from the fuel tank for supply to the engine, discharge means for delivering fuel from the upper end of said drawtube for supply to the engine, and heat exchanger means within said drawtube chamber for heating the fuel as it flows upwardly through said drawtube chamber to said discharge means, said heat exchanger means comprising a heat transfer tube within said drawtube chamber having a first tube portion extending from the upper end of said drawtube downwardly through the interior of said drawtube to a location near the bottom thereof, a second tube portion extending generally parallel to said first tube portion through the interior of said drawtube, and means for interconnecting said first and second portions at the bottom ends thereof, inlet means connected to the first tube portion at the upper end thereof for delivering heating liquid to said tube, and outlet means connected to the second tube portion at the upper end thereof for discharging heating liquid from said tube.

2. A heater according to claim 1 wherein said first and second tube portions of said heat transfer tube having upper portions extending parallel to each other and located in a first vertical plane and lower portions extending parallel to each other and located in a second vertical plane which is transverse to said first vertical plane.

3. A heater according to claim 2 wherein said means for mounting said drawtube comprises a cover plate extending radially outwardly from said drawtube to enclose the fuel tank access opening, said cover plate, said discharge means, and said heat exchanger means being secured together to form a unitary structure which can be inserted into and removed from the interior of the fuel tank as a unit.

4. A heater according to claim 1 wherein said means for mounting said drawtube comprises a cover plate extending radially outwardly from said drawtube to enclose the fuel tank access opening, said cover plate, said discharge means, and said heat exchanger means being secured together to form a unitary structure which can be inserted into and removed from the interior of the fuel tank as a unit.

5. A heater for diesel fuel contained in a fuel tank for supplying a diesel engine of a vehicle, the fuel tank having an access opening at a top portion thereof, comprising:

a drawtube, means for mounting said drawtube to extend vertically from said access opening into said fuel tank to a location near the bottom thereof, discharge means for delivering fuel from the upper end of said drawtube for supply to the engine, and heat exchanger means for heating the fuel as it flows upwardly through said drawtube to said discharge means, said heat exchanger means comprising a heat transfer tube having a first tube portion extending from the upper end of said drawtube downwardly through the interior of said drawtube to a location near the bottom thereof, a second tube portion extending generally parallel to said first tube portion through the interior of said drawtube, and means for interconnecting said first and second portions at the bottom ends thereof, inlet means connected to the first tube portion at the upper end thereof for delivering heating liquid to said tube, and outlet means connected to the second tube portion at the upper end thereof for discharging heating liquid from said tube, said means for mounting said drawtube comprising a cover plate extending radially outwardly from said drawtube to enclose the fuel tank access opening, said cover plate, said discharge means, and said heat exchanger means being secured together to form a unitary structure which can be inserted into and removed from the interior of the fuel tank as a unit.

6. A heater according to claim 5 wherein said first and second tube portions of said heat transfer tube having upper portions extending parallel to each other and located in a first vertical plane and lower portions extending parallel to each other and located in a second vertical plane which is transverse to said first vertical plane.

* * * * *